Sept. 7, 1937.   J. E. ERICKSON   2,092,643
REEL FOR HARVESTERS
Filed Sept. 4, 1936

Inventor:
JOHN E. ERICKSON,
By Christian R. Nielsen.
Attorney

Patented Sept. 7, 1937

2,092,643

UNITED STATES PATENT OFFICE 2,092,643

REEL FOR HARVESTERS

John E. Erickson, East Grand Forks, Minn.

Application September 4, 1936, Serial No. 99,472

3 Claims. (Cl. 56—220)

The invention relates to improvements in reels for harvesters, and has for an object to present a construction of reel which will not wind grain stalks on the projecting end of the axle of the reel as in certain previous reel devices, and which will minimize damage to leaning grain by entanglement thereof on the sweeps, slats or blades of the reel and throwing of the same before the cutter where the head or upper part of the stalk will be cut, causing loss of grain by its damage, or failure to be included under the binding twine.

It is a further object to attain the ends of the invention without requiring a separate mechanical device, or by production of an expensive construction of the reel. It is also an aim of the invention to present such an improved reel which may be utilized on standard harvesting machines without requiring modification of the latter.

Figure 1:
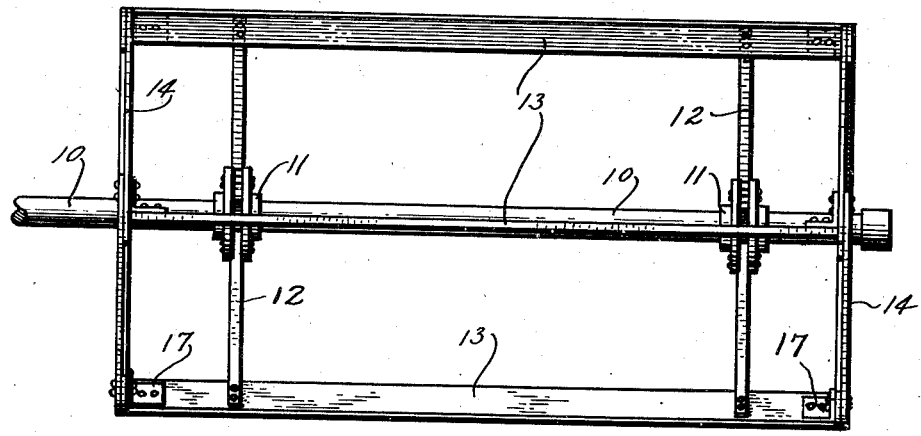

Additional objects, advantages and features of invention reside in the construction, arrangement and combination of parts as will be understood more fully from the following description, and accompanying drawing, wherein Figure 1 is a rear elevation of a reel of the old type upon which my improvement has been incorporated.

Figure 2:
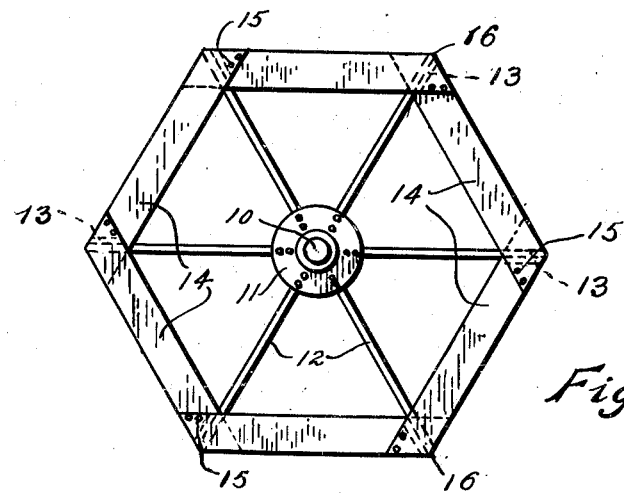

Figure 2 is an end view thereof.

There is illustrated a reel shaft 10, which may be mounted and driven in the conventional manner, and is provided with two hubs 11, in which the spokes 12 of the reel are fixed as heretofore. The spokes are in transversely aligned pairs and upon the ends of each pair a standard sweeper slat 13 is secured as has been customary. Across the ends of each two mutually adjacent slats, fender bars 14 are secured connecting the slats and forming a continuous series extending end to end the full circumference of the reel at its ends. The bars are most important at the outer end of the reel, and in some instances may not be required at the inner ends of the slats 13.

The fender bars 14 may be formed of any light metal, or other light flexible material of proper strength. As shown, the ends of the bars may be bolted, riveted or welded together at 15. A hexagonal frame structure being thus involved in the present instance, the bars form angles at their junctures and for better function of the device in its fender action, the outer edges of the bars at their junctions are angular as illustrated at 16. Various other constructions may of course be employed within the scope of the claims. The bars are secured to the slats at the junction of the bars by being attached to one arm of respective angle bracket plates 17, the other arm of which is attached to the face of the slat.

In this way the reel is strengthened, so that lighter spoke construction may be employed than heretofore used, and the reel therefore kept to an aggregate weight approximating that of the ordinary reel.

In the operation of a harvester with the old form of reel, as the machine advances, the reel sweeps backward against the grain as it is being cut, so that the grain stalks fall rearwardly at right angles to the cutter bar.

When grain has been blown down, or beaten down by rain, there are numerous stalks standing outside the swath of the machine which will nevertheless lean inward over the path of the cutter bar and so as to be engaged by the reel slats. Many of these stalks will be caused to become hooked over the end portions of the slats and lifted upward pulling the roots from the ground or breaking off the stalks against the division board so that the grain becomes wound on the shaft 10, or accumulated on the slats, or tangled on the division board. Other grain being entangled by that hooked on the slats or shaft 10 will be swept against the end of the shaft 10 and wound thereon, so that a mass of grain accumulates that must be cut away finally with appreciable loss in the crop as well as loss of time and efficiency in harvesting the remainder.

By the use of my invention, those stalks standing beside the swath or path of the cutter and leaning inward thereover, will be engaged by the bars 14 and swept rearwardly or pressed out of the way of the slats, this being possible due to the flexibility of the bars and the hexagonal shape at the extremities of the reel. The grain left standing being harvested in the next swath of the machine.

The bars 14 may be made 3¼ to 12 inches wide, and may be made integral with each other, as well as various other modifications embodied, within the scope of the appended claims, without departing from the spirit of the invention.

I claim:

1. A reel for harvesters comprising a plurality of sweeps mounted in fixed mutual relation for rotation concentrically and being parallel to and in series concentric with the axis of rotation, and connecting means extending from sweep to sweep at their extremities to form a continuous fender means for the purposes described.

2. A reel for harvesters comprising a reel shaft, hubs thereon for rotation therewith, radially extended spokes on the hubs, sweeper slats on the extremities of the spokes and lying in parallel relation to the shaft, the ends of the slats extending beyond the hubs, and flexible bar members connecting the slats at their extremities forming a continuous fender means for the purposes described.

3. A reel for harvesters comprising a reel shaft, hubs thereon for rotation therewith, radially extended spokes on the hubs, sweeper slats on the extremities of the spokes and lying in parallel relation to the shaft, the ends of the slats extending beyond the hubs and flexible bar members connecting the slats at their extremities, the ends of the bars being arranged in angular abutting, overlapping relation and defining a continuous hexagonal fender means.

JOHN E. ERICKSON.